June 5, 1956

W. F. H. SLATEN 2,748,735

DEVICE FOR RESTORING TO SHAPE THE WALLS AND
BOTTOMS OF DEFORMED SHEET METAL BREAD PANS

Filed Dec. 23, 1954

INVENTOR.
William F. H. Slaten
BY
McMorrow, Berman & Davidson
ATTORNEYS

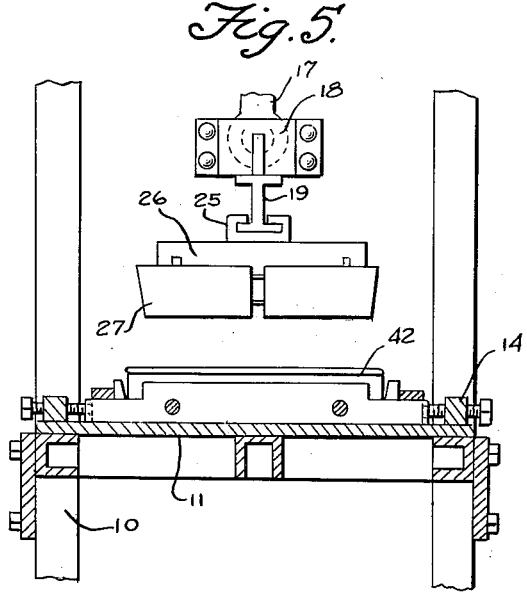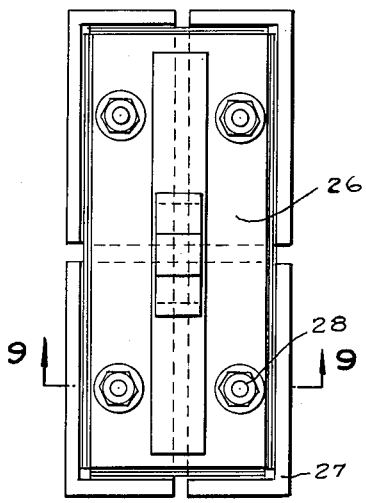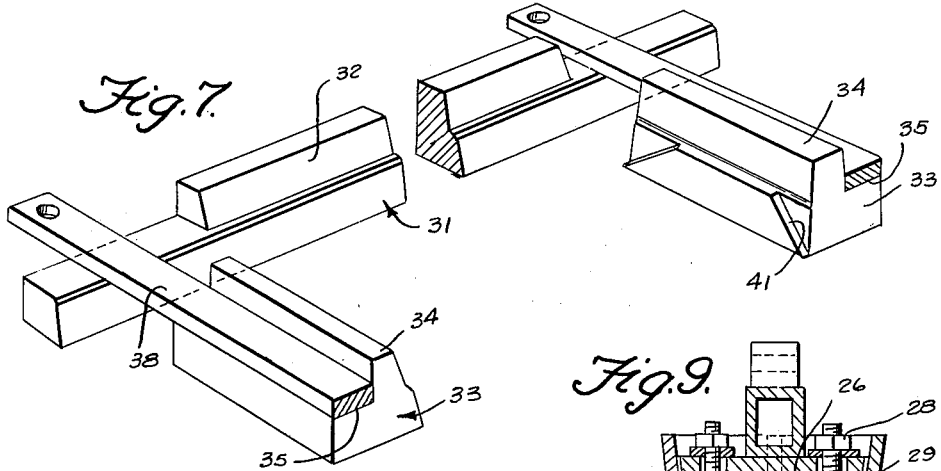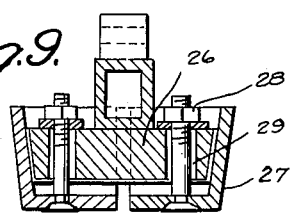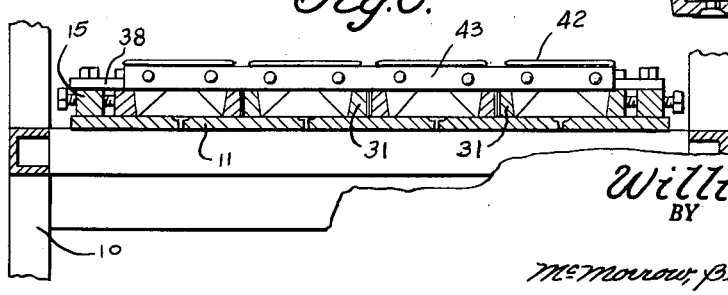

June 5, 1956  W. F. H. SLATEN  2,748,735
DEVICE FOR RESTORING TO SHAPE THE WALLS AND
BOTTOMS OF DEFORMED SHEET METAL BREAD PANS
Filed Dec. 23, 1954  3 Sheets-Sheet 3
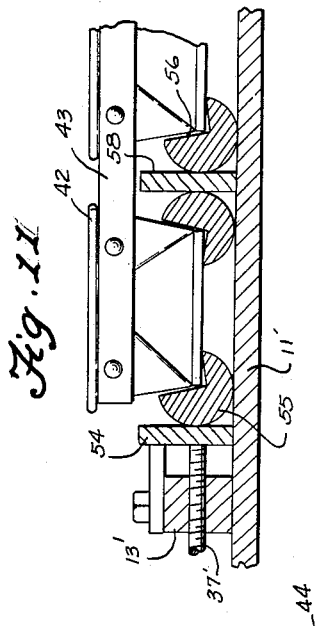
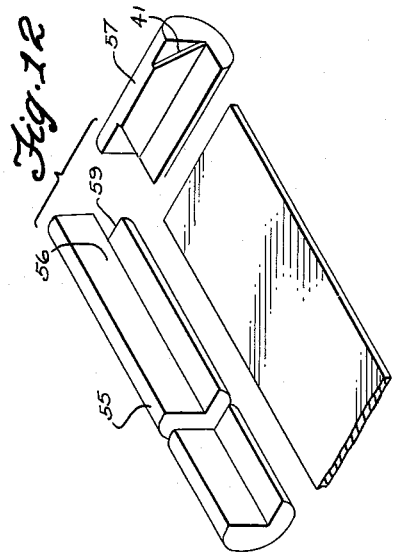
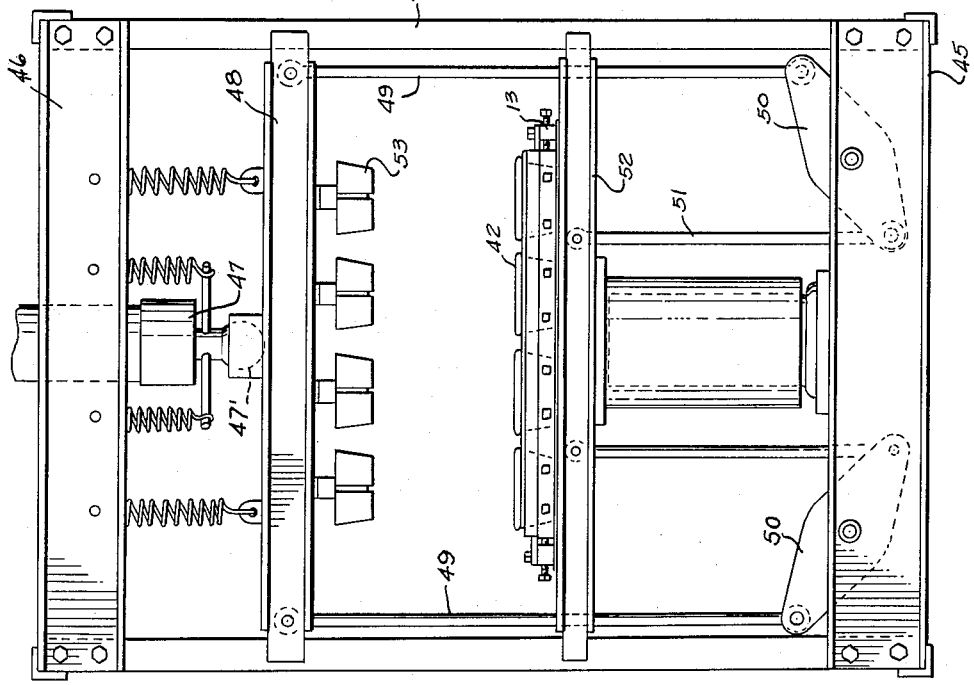
INVENTOR.
William F. H. Slaten
BY
McMorrow, Berman & Davidson
ATTORNEYS

United States Patent Office 2,748,735
Patented June 5, 1956

2,748,735

DEVICE FOR RESTORING TO SHAPE THE WALLS AND BOTTOMS OF DEFORMED SHEET METAL BREAD PANS

William F. H. Slaten, Van Nuys, Calif.

Application December 23, 1954, Serial No. 477,279

2 Claims. (Cl. 113—48)

The present invention relates to a device for restoring to shape sheet metal bread pans which have had their bottoms and walls dented or deformed and which are commonly coated on the inside with a varnish coating to be left intact by any reforming operation.

The present invention has for its principal object to provide a machine which will restore to shape the deformed sheet metal pans used in commercial bakeries which have coatings on their inner walls requiring special care and treatment.

Another object of the invention is to provide a device for restoring to shape the walls and bottoms of sheet metal bread pans which may be used with bread pans which are assembled in groups of two or more and are connected together by a metal band.

A further object of the present invention is to provide a device for restoring to shape the deformed walls and bottoms of bread pans which are connected together in various spaced distances from each other, and one having movable reshaping blocks which may be arranged in a suitable manner in order to accommodate the variously positioned pans.

These and other objects and advantages of the present invention will be fully apparent from the following description when taken in connection with the annexed drawings, in which:

Figure 5 is an end view partly in cross section on line 5—5 Figure 1;

Figure 6 is a front view partly in cross section on line 6—6 of Figure 2;

Figure 7 is a view in perspective of the reshaping blocks of the present invention;

Figure 8 is a horizontal sectional view on line 8—8 of Figure 1;

Figure 9 is a cross sectional view on line 9—9 of Figure 8;

Figure 10 is a front elevational view of a further embodiment of the shaping press of the present invention;

Figure 11 is a partial detail view in cross section of a second embodiment of the side reshaping blocks; and Figure 12 is a view in perspective of the reshaping blocks of the second embodiment.

Figure 1:
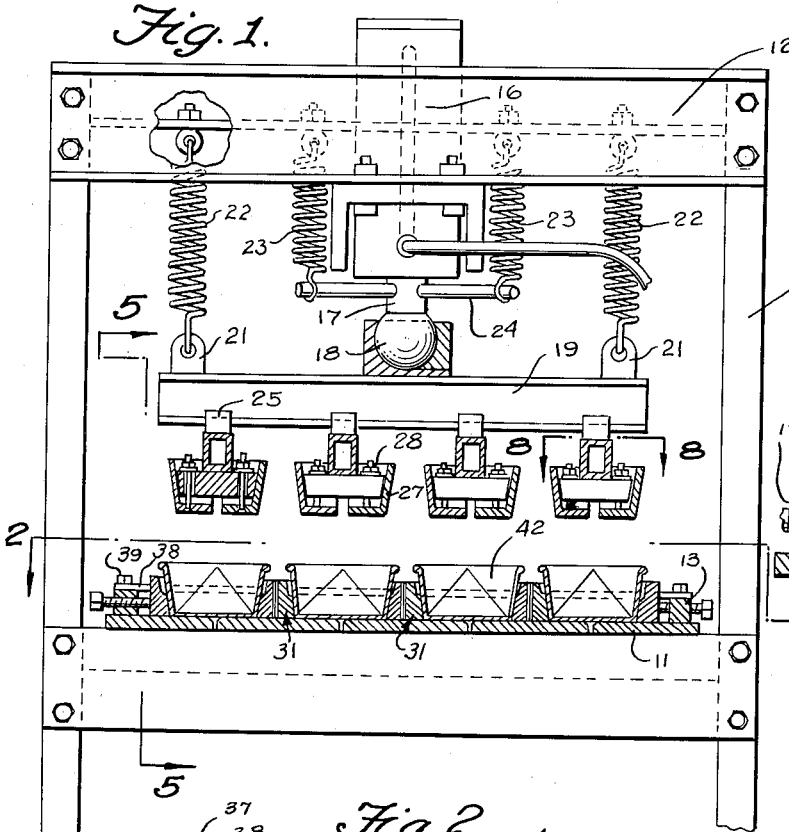
Figure 1 is a front elevational view partly in cross section of the present invention showing a plurality of bread pans in place ready to be reshaped.
Figure 3:
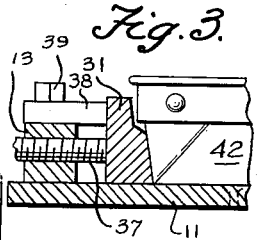
Figures 3 and 4 are fragmentary cross sectional views of the side and end reshaping block, respectively.

Referring in greater detail to the drawings in which like numerals indicate like parts throughout the several views, the invention will be seen to consist of standards 10 which support a base 11 and an overhead support 12.

A substantially rectangularly shaped frame 13 is positioned horizontally and secured to the base 11. The frame 13 is formed with side pieces 14 and end pieces 15 connecting each one of the adjacent ends of the side pieces 14.

A hydraulic ram 16 is vertically secured to the overhead support 12 and its movable end 17 is formed with a ball joint 18 which supports a hanger member or an I-beam 19.

At each end of the I-beam 19 are the lugs 21 welded or otherwise affixed to the upper flange of the I beam and in each of which is connected one end of the springs 22, the other ends of which are connected to the support 12. Other springs 23 are connected to the support 12 at one end and by their other ends to the rods 24 which project outwardly from the end 17 of the ram 16.

The lower flange of the I-beam 19 slidably receives the channel brackets 25 of the male die support 26, as seen best in Figure 5.

In Figure 9 the male die support 26 is seen to be provided with reshaping shoes 27 which are secured to the support 26 by means of the bolts 28 carried by the shoes and extending loosely through the holes 29 formed in the support 26.

The inner surfaces or walls of the reshaping shoes 27 are tapered to fit the tapered outer walls of the male die support 26 and sufficient play is given to the shoes 27 so that as they move downward they also move outwardly when in contact with the inside of one of the bread pans.

The female die portion of the invention consists of the side reshaping blocks 31, each one of which has a guide portion 32, Figure 7, extending upwardly at a spaced distance from each end of the block 31. End reshaping blocks 33 have similar guide portions 34, Figure 7, but are also formed with shoulders 35.

The side reshaping blocks 31 are positioned within the frame 13 between and in parallel spaced relation with respect to the end pieces 15 of the frame 13.

Figure 2:
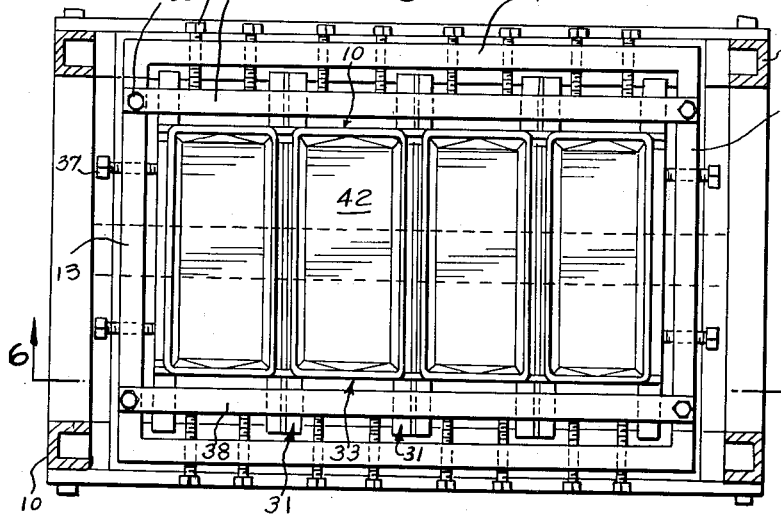
Figure 2 is a top plan view on line 2—2 Figure 1.
Figure 4:
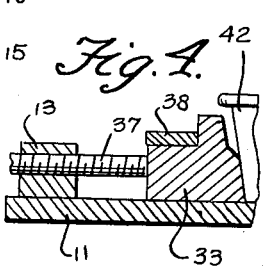

As shown in Figure 2, an end reshaping block 33 extends transversely between adjacent side reshaping blocks 31 near each one of the adjacent ends of the blocks 31. The adjacent side blocks 31 and the associated end blocks 33 form a female die to receive the pan to be reshaped.

The frame 13 is provided with a plurality of threaded bores 36 in which the machine bolts 37 are positioned and bear against the side walls of each of the side reshaping blocks 31 and the end reshaping blocks 33 to adjust them to the proper positions with respect to the pan to be reshaped. When in the assembled position, a bar 38 rests on each one of the shoulders 35 of the end reshaping blocks 33 and crosses over the ends of the side reshaping blocks 31. Bolts 39 secure the bars 38 to the end pieces 15 of the frame 13. The bars 38 which rest upon the end reshaping blocks 33 and cross over the ends of the side reshaping blocks 31 and are secured to the end pieces 15 of the frame 13 by means of releasable bolts 39 constitute means carried by the frame end pieces engageable simultaneously with the end reshaping blocks and the side reshaping blocks for releasably locking said blocks to the base 11. Each of the end reshaping blocks 33 is formed with angled recesses 41 into which fit the creased portions of the bread pans 42 which are seen in Figure 6. As generally used in commercial bakeries, the pans 42 are connected together by a metal strip 43 riveted or spot welded thereon and are usually in sets of two or more and as many as five in a group, depending upon the type of bakery handling conveyors in use in the particular bakery.

In operation the pans 42 are set into the female die formed by the side reshaping blocks 31 and the end reshaping blocks 33 and the blocks are shimmed up and against the pans to whatever space is suitable and the machine bolts 37 are tightened and the bar 38 is placed across the shoulders 35 of the end reshaping blocks and across the ends of each one of the side reshaping blocks and is secured to the frame 13. A suitable number of male die assemblies are positioned on the I-beam 19 in the proper space above the pans 42 and the ram 16 lowers a male die into each one of the pans and with a suitable pressure, preferably forty tons, the pans 42 are reshaped to their former condition, the action of the reshaping shoes 27 on the tapered die support 26 permits the shoes to enter, expand, and collapse without seriously scraping or removing the varnish coating in the pan.

In a second embodiment of the present invention, the reshaping press has a pair of standards 44 with a foot 45 and an overhead support 46. The ram 47 is vertically secured to the overhead support 46 and its movable end is formed with a ball joint 47' which supports the hanger member or I-beam 48, the ends of which are coupled by means of bars 49 to the rockable couplers 50. A table 52 carrying the female dies with pans 42 supported therein is connected for movement with the couplers 50 by means of the bars 51, one end of the bars being connected to the couplers 50 and the other end of the bars 51 being connected to the table 52. The hanger member or I-beam 48 dependingly carries the male dies 53 which are received in the pans 42 when the table 52 is moved upwardly by the couplers 50.

This reshaping press may be used with the reshaping shoes 27 and the side and end reshaping blocks 31 and 33 respectively, or may be used with other reshaping blocks of another and second form, as follows:

In Figures 11 and 12, the frame 13' has bolts 37' for adjusting a positioning bar 54 inwardly and outwardly over the base 11'. The side reshaping blocks 55 are made up in suitable lengths to accommodate all lengths of pans 42 and are each formed with a rounded outer wall and bottom. This permits them to adjust themselves to the side and bottom of the pan as it is lowered into engagement, the cut away portion, indicated at 56, having the exact angularity of the pan bottom and side angle.

End reshaping blocks 57 are similarly formed, and have the angled recesses 41' as in the first embodiment. The end reshaping blocks 57 are also sized to fit the ends of one or more pans when assembled in their strips 43. Intervening bars 58 are provided to separate adjacent side reshaping blocks 55.

In this embodiment of the components forming the female dies, the respective end and side blocks have interlocking corners as indicated at 59 in Figure 12 but do not require any means for locking them within the frame 13'.

While only preferred embodiments of the present invention have been here shown and described, other embodiments may be made and practiced and many changes and modifications may be made in the present invention within the scope of the appended claims, without departing from the spirit of the invention.

What is claimed is:

1. A device for restoring to shape deformed sheet metal bread pans comprising a standard, a base supported on said standard, an overhead support carried by said standard, a horizontally disposed frame having a pair of side pieces and end pieces connecting the adjacent ends of the side pieces fixed on said base, a plurality of side reshaping blocks positioned within said frame between and in parallel spaced relation with respect to said end pieces of said frame, an end reshaping block extending transversely between adjacent side reshaping blocks near each one of adjacent ends of the side reshaping blocks, the adjacent side blocks and the associated end blocks forming a plurality of female dies, means carried by the frame side pieces and engageable with the end reshaping blocks for holding the latter in assembled position, means carried by the frame end pieces and engageable with the adjacent side reshaping blocks for holding the latter in assembled position, means carried by the frame end pieces engageable simultaneously with the end reshaping blocks and the side reshaping blocks for releasably locking said blocks to said base, a hanger member positioned below and spaced from said support and connected to said support for vertical up and down movement with respect to said base, means for effecting the up and down movement of said hanger member, and a plurality of male dies dependingly carried by said hanger member and arranged to register with the female dies in said frame.

2. In a device for restoring to shape deformed sheet metal bread pans, a female die assembly comprising a base, a horizontally disposed frame having a pair of side pieces and end pieces connecting adjacent ends of the side pieces fixed on said base, a plurality of side reshaping blocks positioned within said frame between and in parallel spaced relation to the said end pieces of said frame, an end reshaping block extending transversely between adjacent side reshaping blocks near each one of the adjacent ends of the side reshaping blocks, the adjacent side blocks and the associated end blocks forming a plurality of female dies, said end reshaping blocks being formed with a horizontally disposed shoulder, an elongated bar connected at each of its ends to said frame end pieces and overlying the ends of said side reshaping blocks and said shoulders for releasably locking said blocks to said base, an overhead support operatively connected to said base, a hanger member positoned below and spaced from said support and connected to said support for vertical up and down movement with respect to said base, means for effecting the up and down movement of said hanger member, a plurality of male dies dependingly carried by said hanger member and arranged to register with the female dies in said frame, and springs connected by one end of each to said hanger member and by the other end of each to said support biasing said hanger member upwardly from said base.

References Cited in the file of this patent

UNITED STATES PATENTS

| | | |
|---|---|---|
| 172,640 | Martyn | Jan. 25, 1876 |
| 921,974 | Ginsburg | May 18, 1909 |
| 958,459 | Ames | May 17, 1910 |
| 996,601 | Ames | July 4, 1911 |
| 1,004,852 | Costa | Oct. 3, 1911 |
| 1,255,237 | Sevigne | Feb. 5, 1918 |
| 1,443,075 | Guilford | Jan. 23, 1923 |
| 1,941,078 | Eriksson | Dec. 26, 1933 |
| 2,031,345 | Tinkham | Feb. 18, 1936 |
| 2,421,457 | Lindsay | June 3, 1947 |

FOREIGN PATENTS

| | | |
|---|---|---|
| 17,331 | Great Britain | Oct. 1, 1900 |
| 52,634 | Austria | Mar. 11, 1912 |